United States Patent
Nagata et al.

(10) Patent No.: US 9,430,690 B2
(45) Date of Patent: Aug. 30, 2016

(54) OPTICAL INFORMATION READING DEVICE

(71) Applicant: Keyence Corporation, Osaka (JP)

(72) Inventors: Hidezumi Nagata, Osaka (JP); Takuki Nakagawa, Osaka (JP); Yutaka Kamimura, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 14/794,864

(22) Filed: Jul. 9, 2015

(65) Prior Publication Data

US 2016/0034736 A1 Feb. 4, 2016

(30) Foreign Application Priority Data

Jul. 31, 2014 (JP) ................... 2014-157028

(51) Int. Cl.
*G06K 7/10* (2006.01)
*G06K 7/14* (2006.01)

(52) U.S. Cl.
CPC ........... *G06K 7/1404* (2013.01); *G06K 7/1495* (2013.01)

(58) Field of Classification Search
CPC .. G06K 5/00; G06K 7/10702; G06K 7/1404; G06K 7/1495
USPC ....................................... 235/454
See application file for complete search history.

(56) References Cited

U.S. PATENT DOCUMENTS

| 8,027,095 B2* | 9/2011 | Havens | G02B 3/14 359/665 |
| 2007/0285537 A1* | 12/2007 | Dwinell | G06T 7/001 348/263 |
| 2012/0067952 A1* | 3/2012 | Matsuda | G06K 5/00 235/437 |

FOREIGN PATENT DOCUMENTS

JP 2011-076519 4/2011

* cited by examiner

*Primary Examiner* — Seung Lee
(74) *Attorney, Agent, or Firm* — Kilyk & Bowersox, P.L.L.C.

(57) ABSTRACT

Provided is an optical information reading device that displays, as an image, information that can be conveniently checked in setting work and in maintenance work. A decoding unit decodes image data acquired by an imaging element, and an arithmetic operation unit arithmetically operates a matching level indicating easiness of the decoding of a code, stability of the decoding, a margin of the decoding or pixel-per-cell in the decoding unit. Furthermore, a UI management unit and an image display device display, as an image, at least one of the matching level, the image data acquired by the imaging element, and an average success rate (reading success rate) of the decoding obtained by decoding a plurality of pieces of image data obtained by capturing an image of the code a plurality of times.

19 Claims, 12 Drawing Sheets

FIG. 9

○ ··· DISPLAYED
— ··· NOT DISPLAYED

|      | TEST | OPERATION | MAINTENANCE |
|------|------|-----------|-------------|
| 100A | ○    | ○         | ○           |
| 100B | ○    | ○         | ○           |
| 100C | —    | ○         | —           |
| 100D | ○    | —         | ○           |
| 100E | ○    | —         | ○           |

OPTICAL INFORMATION READING DEVICE

CROSS-REFERENCE TO RELATED APPLICATIONS

The present application claims foreign priority based on Japanese Patent Application No. 2014-157028, filed Jul. 31, 2014, the contents of which is incorporated herein by reference.

BACKGROUND OF THE INVENTION

1. Field of the Invention

The present invention relates to a fixed optical information reading device of optical information reading devices that optically read information.

2. Description of Related Art

There are a handy-type optical information reading device that reads a code in a state where an operator holds the device in his or her hand, and a fixed optical information reading device that is fixed and reads information by moving an object with a code attached. A two-dimensional code reader (hereinafter, referred to as a reader) that reads a two-dimensional code such as a barcode, and a QR code (registered trademark) has been widely spread. One example of the above-described reader is described in JP 2011-76519 A.

Generally, a fixed reader is not provided with a display, and OK/ERR (error) indicating whether or not decoding of a two-dimensional code has succeeded is outputted to external equipment through an I/O terminal. Alternatively, the reader is provided with only a simple display unit that lights a green light emitter in the case of OK, and lights a red light emitter in the case of ERR. Thus, a computer (PC) connected to the reader through a communication cable needs to make setting of the reader as described in JP 2011-76519 A. In order to read the two-dimensional code of a workpiece conveyed on a production line, the reader may be installed on the production line. There is not sufficient space around the above-described reader, which makes it difficult to connect the PC. Thus, setting work and maintenance work of the reader are not easy for a user. It will be thus convenient to execute the setting work and the maintenance work by the reader alone.

However, if all the setting work, which has been performed in the PC so far, is executed in the reader, an increase in size of the reader will be caused. Accordingly, it will be convenient for the user if there is provided an image display device that displays information that can be conveniently checked in the setting work and the maintenance work, for example, an image obtained by capturing the two-dimensional code, a matching level useful for adjusting a distance between the reader and the workpiece, and the like.

SUMMARY OF THE INVENTION

Consequently, an object of the present invention is to provide a fixed optical information reading device that displays, as an image, information that can be conveniently checked in setting work and in maintenance work.

According to the present invention, provided is, a fixed optical information reading device, for example, including:
an instruction unit provided in the fixed optical information reading device;
an imaging section that captures an image of a code provided in a workpiece;
a decoding section that decodes image data acquired by the imaging section;
an arithmetic operation section that arithmetically operates a matching level indicating easiness of the decoding of the code, stability of the decoding, a margin of the decoding, or pixel-per-cell in the decoding section;
an image display section that displays, as an image, at least one of the matching level, the image data acquired by the imaging section, and an average success rate of the decoding obtained by decoding a plurality of image data obtained by capturing the image of the code a plurality of times; and
a reading condition control section that controls a reading condition including an imaging condition of the imaging section, and an image processing condition in the decoding section, wherein
the reading condition control section can perform tuning which is processing of searching for the reading condition suitable for the reading of the code, by an instruction from the instruction unit, and
after the tuning ends, the image display section displays at least one of the matching level, the image data acquired by the imaging section, and the average success rate of the decoding obtained by decoding the plurality of pieces of image data obtained by capturing the image of the code the plurality of times.

According to the present invention, there is provided an optical information reading device that displays, as an image, information that can be conveniently checked in setting work and in maintenance work.

BRIEF DESCRIPTION OF THE DRAWINGS

FIG. 9 is a diagram showing the UI image in each operating mode;

DETAILED DESCRIPTION OF PREFERRED EMBODIMENTS

In the following, an embodiment of the present invention will be described. The individual embodiments described in the following will be useful for understanding various concepts such as a superordinate concept, a medium concept, a subordinate concept and the like of the present invention. Moreover, the technical scope of the present invention is defined by the claims, and is not limited by the following individual embodiments.

Figure 1:
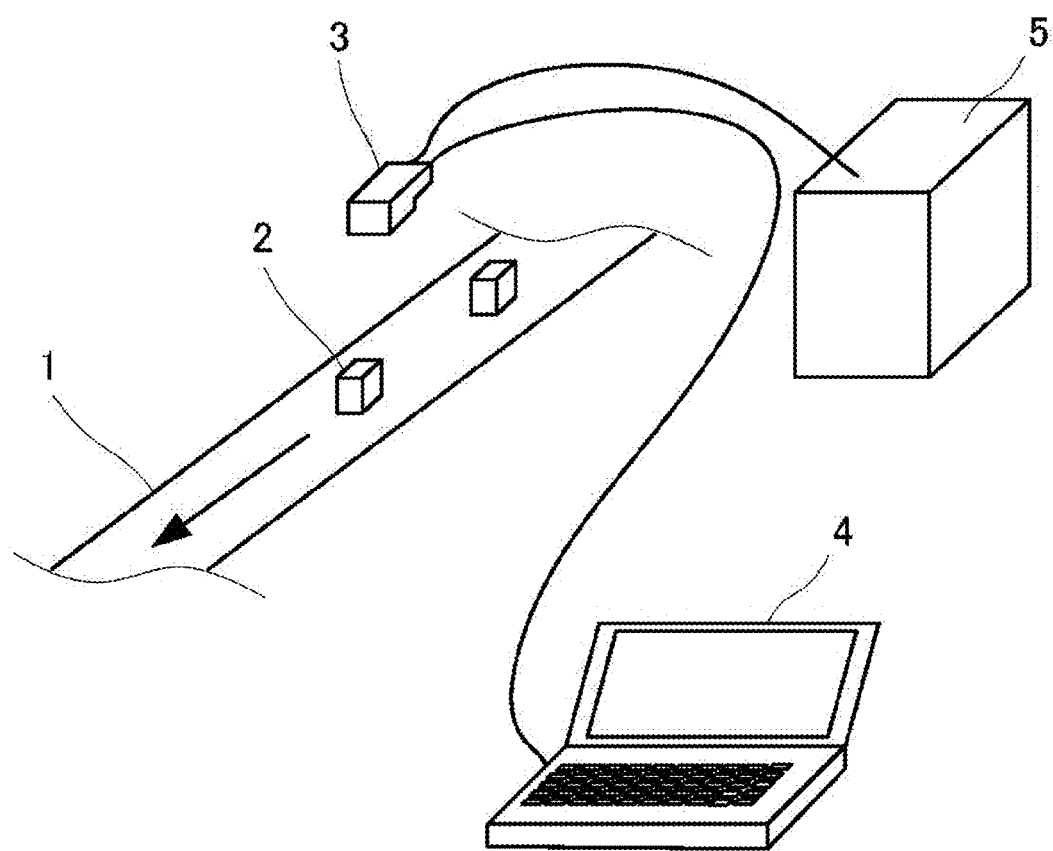
FIG. 1 is a diagram showing an optical information reading device.

FIG. 1 is a diagram showing one example of a reader system (an optical information reading device). A line 1 is a conveyance belt or the like that conveys a workpiece 2 which is an inspection object. A reader 3 is a two-dimensional code reader that reads and decodes a two-dimensional code. The reader 3 itself is also an optical information reading device in a narrow sense. A programmable logic controller (PLC 5) is a control device that controls the line 1 and the reader 3. A computer 4 is an information processing device that sets an operating condition and the like for the reader 3, and obtains a decoding result from the reader 3 to display the same.

<Structure of Reader 3>

Figure 2A:
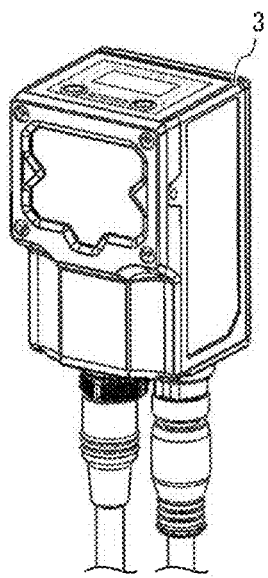
FIGS. 2A and 2B are diagrams showing a structure of the optical information reading device.
Figure 2B:
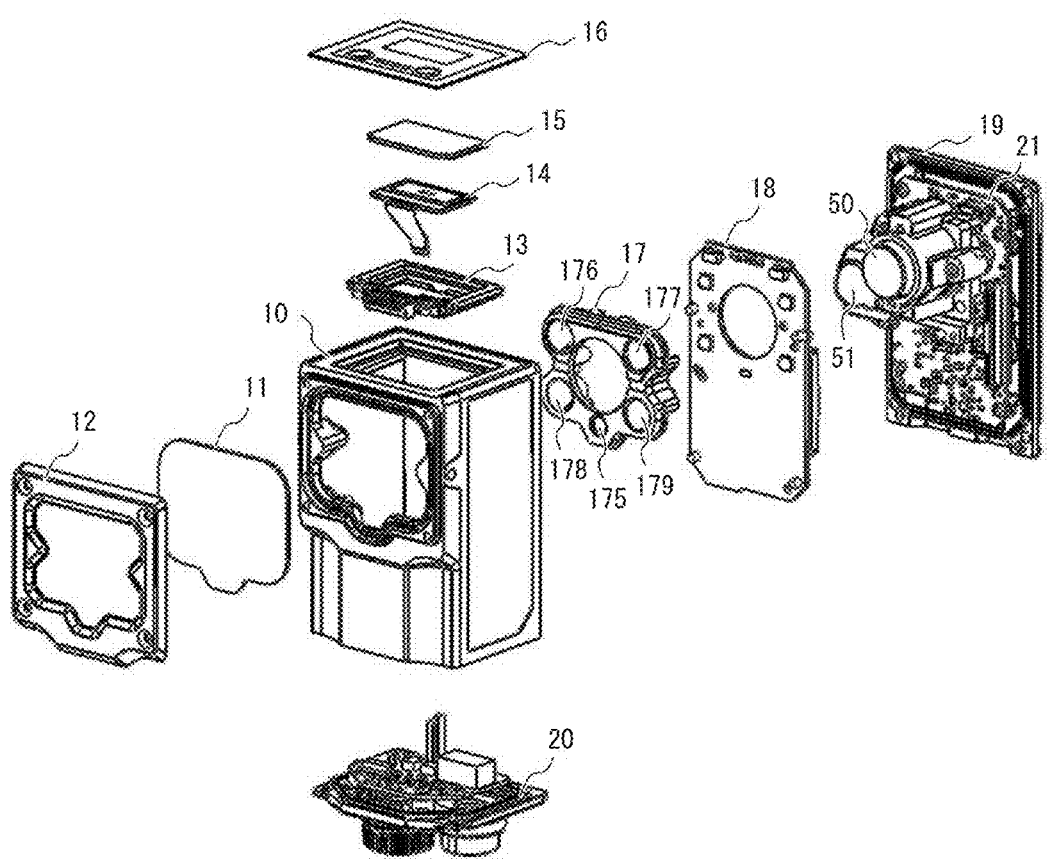

FIG. 2A is a perspective diagram of the reader 3, and FIG. 2B is an exploded diagram of essential parts. Since the shape of the reader 3 is substantially rectangular parallelepiped, outer surfaces of the housing consist of six surfaces. As shown in FIG. 2B, four openings are provided in a front case 10. In the opening on an upper surface side, a holder 13, an image display device 14 supported by the holder 13, a display panel 15 arranged so as to cover the image display device 14, and a main sheet 16 are provided. In the opening on a front surface side of the front case 10, a window portion 11 having translucency and a front cover 12 are provided. A polarization film and the like may be provided in a part of the window portion 11. A reflector 17 and an illumination substrate 18 are inserted from the opening on a back surface side of the front case 10, and a rear case 19 is put like a lid. In the rear case 19, a main substrate 21, and an optical system 50 and an AF mechanism 51 fixed to the main substrate 21 are provided. The reflector 17 is a structural part to efficiently irradiate a front side with light from light emitters provided in the illumination substrate 18. In the reflector 17, there are provided cone type light condensing portions 176 to 179 to condense the light from the light emitters for illumination on the front side and irradiate the front side, and a cone type light condensing portion 175 to condense light from the light emitter for a pointer on the front side to irradiate the front side. These are gold-plated, for example, in order to increase light condensation efficiency. A connector holder 20 is attached to the opening on a lower surface side of the front case 10. Two communication cables are connected to the connector holder 20, and are connected to the computer 4 and the PLC 5, respectively. A connector substrate is attached to the connector holder 20.

Figure 3A:
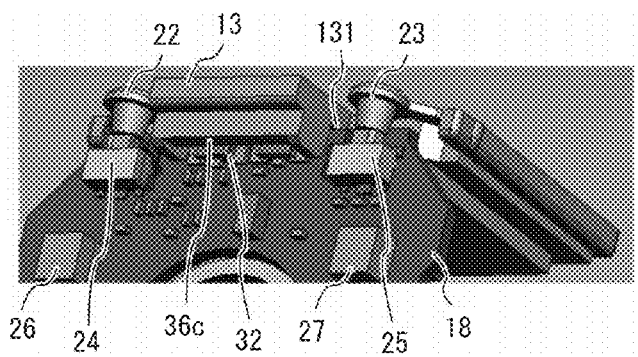
FIGS. 3A to 3C are diagrams showing a support structure of an image display device.
Figure 3B:
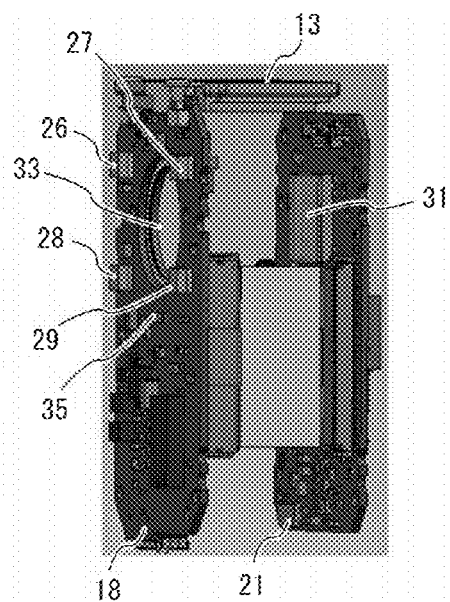
Figure 3C:
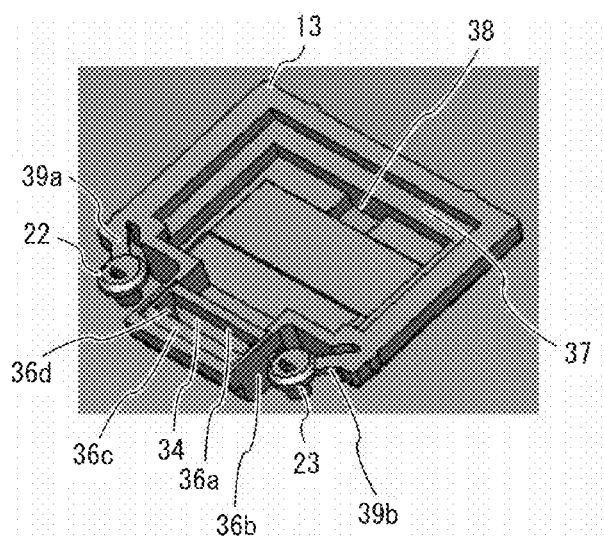

FIGS. 3A to 3C are diagrams for describing a structure around the holder 13. As shown in FIGS. 3A and 3B, the holder 13 is a support member that supports the image display device 14. The illumination substrate 18 extends in a direction perpendicular to the holder 13 and is engaged with the holder 13 to support the holder 13. That is, the holder 13 is provided parallel to an upper surface of the front case 10, and the illumination substrate 18 is provided parallel to a front surface of the front case 10, so that both are perpendicular to each other. A groove 131 is provided on a lower surface side of the holder 13, and an end portion of the illumination substrate 18 may be fitted in the groove 131 to thereby firmly fix the holder 13 to the illumination substrate 18. Employing the above-described holder 13 can make a circuit board for attaching the image display device 14 unnecessary.

As shown in FIGS. 3A and 3C, in the illumination substrate 18, there may be arranged push-button type switches 24, 25 in each of which a pressing surface exists on the same side as a display surface side of the image display device 14. A constitution may be such that the switches 24, 25 are pressed by pressing members 22, 23 constituted integrally with the holder 13, respectively, so that respective contacts are closed. Since a pressing direction of the switches 24, 25 and a length direction of the illumination substrate 18 supporting the holder 13 are coincident with each other, the holder 13 is hard to be warped even when the switches 24, 25 are pressed. The pressing member 22 is supported by an elastic arm portion 39a extending from a main constituent of the holder 13. Similarly, the pressing member 23 is supported by an elastic arm portion 39b extending from the main constituent of the holder 13. The pressing members 22, 23 pressed down return to original positions by elasticity of the arm portions 39a, 39b. Since the arm portions 39a, 39b are constituted integrally with the holder 13, there is an advantage that additional members for returning such as springs can be omitted.

As shown in FIGS. 3A and 3B, the illumination substrate 18 is provided with a circular opening portion 33 to mount an optical system module (the optical system 50, the AF mechanism 51 and the like) provided corresponding to an imaging element 31. Four light emitters 26 to 29 for illumination are provided around the opening portion 33. As shown in FIG. 3A, one or a plurality of light emitters 32 functioning as an indicator are provided in the vicinity of an engagement portion between the illumination substrate 18 and the holder 13. An opening portion 34 for guiding light is provided in the holder 13 so that light from the light emitters 32 is outputted outside from the upper surface of the front case 10. That is, the indicator is arranged between the two switches 24, 25. As shown in FIG. 3C, four sides of the opening portion 34 are surrounded by light-shielding walls 36a to 36d, which makes the light of the indicator hard to leak to the image display device 14. The holder 13 is provided with a container groove 37 to contain the image display device 14. A hole portion 38 to pass a signal cable of the image display device 14 is provided in a bottom portion of the container groove 37.

As shown in FIG. 3B, the imaging element 31 is arranged in the main substrate 21. As shown in FIG. 3B, in the illumination substrate 18, a light emitter 35 that outputs light for the pointer is arranged. As described above, in the reflector 17, in addition to the light condensing portion 175 for the light emitter 35, the light condensing portions 176 to 179 for light emitters 26 to 29 are provided. The light condensing portions 175 to 179 each have a cone shape, so that the light comes in from an opening on a top side of the cone and goes out from a bottom surface side.

Figure 4:
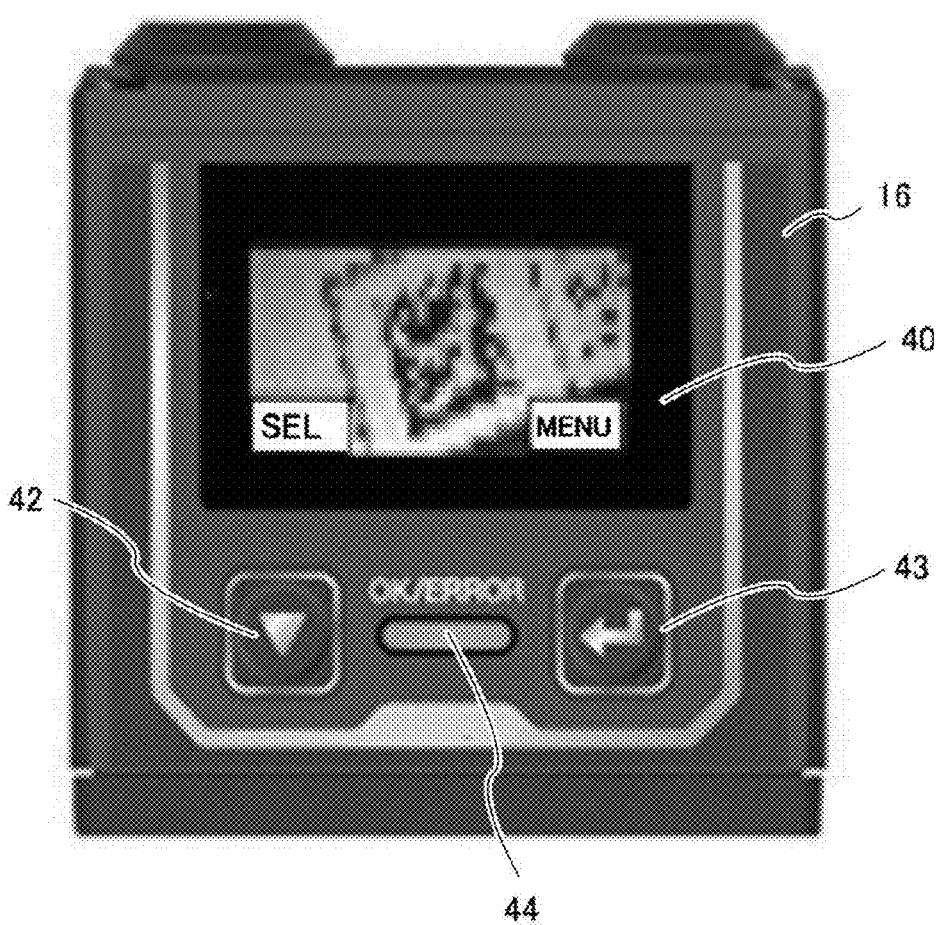
FIG. 4 is a diagram showing display and an operation panel of the optical information reading device.

FIG. 4 is a diagram showing the main sheet 16. A display surface 40 of the image display device 14 is provided in a central portion of the main sheet 16. A select key 42, an indicator 44, and an enter key 43 are provided in a lower portion of the main sheet 16. The select key 42 is made up of the above-described switch 24 and pressing member 22. The enter key 43 is made up of the above-described switch 25 and pressing member 23. The indicator 44 is made up of the two light emitters 32, and for example, when reading of the two-dimensional code succeeds, the green light emitter lights, and when the reading of the two-dimensional code fails, the red light emitter lights. The image display device 14 may display an image (SEL and MENU (however, it may be displayed as ENT) in FIG. 4) that shows the user assignments of the select key 42 and the enter key 43 in addition to an image (a still image or a moving image) acquired by the imaging element 31.

<Control Unit>

Figure 5:
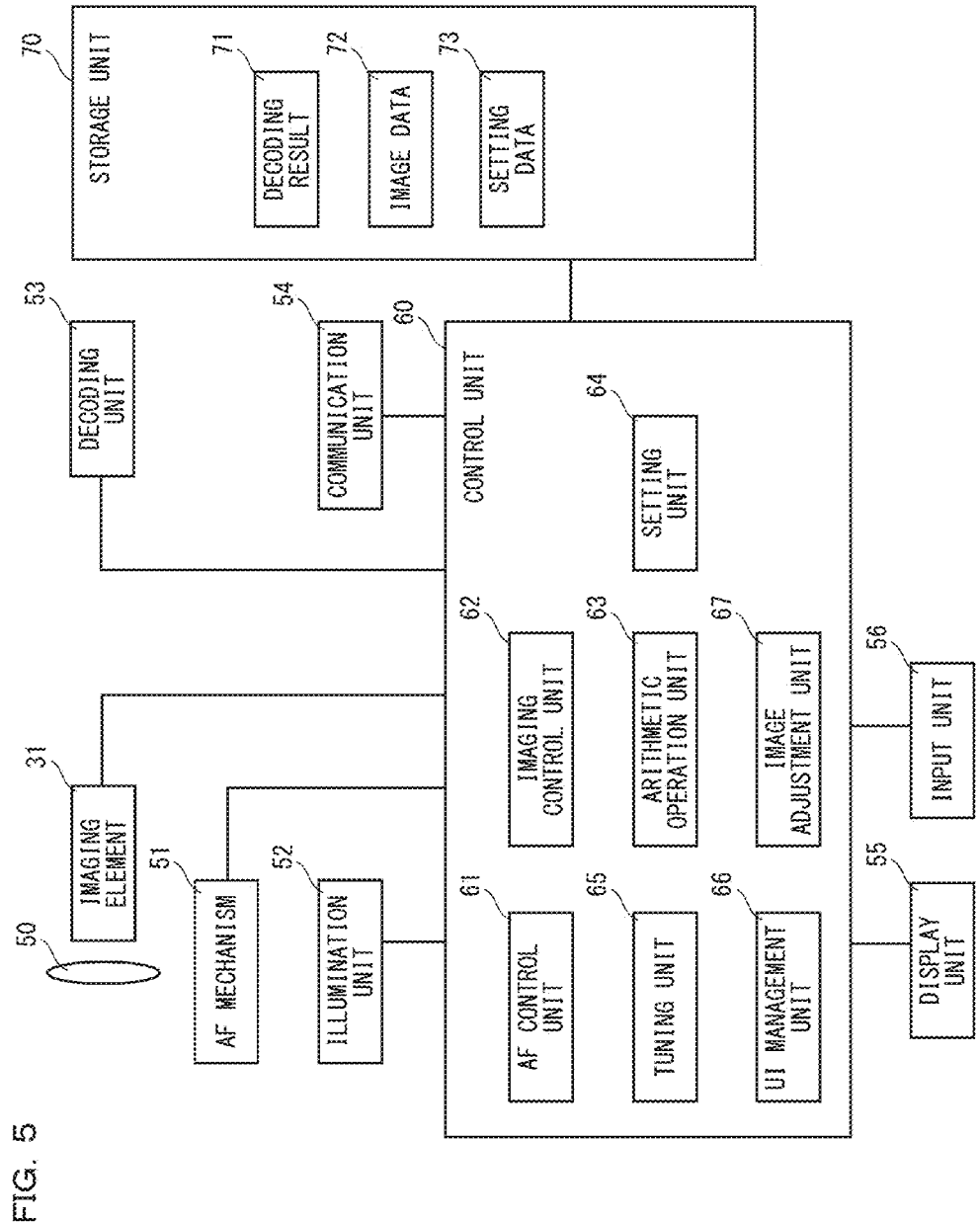
FIG. 5 is a diagram showing an electronic configuration of the optical information reading device.

FIG. 5 is a block diagram showing an electronic configuration of the reader 3. A camera unit (imaging section) of the reader 3 has the imaging element 31, the optical system 50, the AF mechanism 51, an illumination unit 52 and the like. The imaging element 31 is an image sensor such as a CCD and a CMOS that converts an image of the two-dimensional code formed through the optical system 50 to an electrical signal. The AF mechanism 51 is a mechanism that adjusts a position and a refractive index of a lens for focusing in the optical system 50. The AF mechanism 51 and the optical system 50 are arranged between the imaging element 31 and the opening portion 33 in FIG. 3B. The AF mechanism 51 and the optical system 50 may be integrated to make up the optical system module.

The illumination unit 52 is a unit that has one or more light emitters to illuminate the two-dimensional code. The illumination unit 52 has, for example, the light emitters 26 to 29 for illumination, and the light emitter 35 for the pointer. The light of the pointer is a criterion for an optical axis of the optical system 50, and the user may place the workpiece 2 at a proper position with reference to a position of the pointer.

A decoding unit 53 is a unit that decodes image data 72 of the two-dimensional code acquired by the imaging element 31 to write a decoding result 71 in a storage unit 70. A communication unit 54 is a unit that communicates with the PLC 5 and the computer 4. The communication unit 54 may include, for example, an I/O unit that communicates with the PLC 5, a serial communication unit such as an RS232C, a network communication unit such as a wireless LAN and wired LAN and so on.

A display unit 55 includes the image display device 14 and the light emitters 32 for indicator. The display unit 55 may display, for example, a character string, which is the decoding result 71 of the two-dimensional code, a reading success rate (an average reading success rate when reading processing is executed a plurality of times), a matching level (a reading margin indicating easiness of the reading), PPC (pixel per cell: a value indicating how many pixels one of cells making up the two-dimensional code is equivalent to in the image data), and the like. An input unit 56 is a unit that accepts an input operation of each of the switches or the like, and includes the select key 42 and the enter key 43.

A control unit 60 is a unit that comprehensively controls the respective units of the reader 3. The control unit 60 has various functions, and these may be implemented by a logical circuit, or by executing software. An autofocus control unit (AF control unit) 61 is a unit that controls the AF mechanism 51. An imaging control unit 62 is a unit that controls the amount of illumination light of the illumination unit 52, and an exposure time (shutter speed) of the imaging element 31.

An arithmetic operation unit 63 executes various types of arithmetic operation processing. For example, the arithmetic operation unit 63 arithmetically operates the reading success rate, the matching level, and the PPC, using the decoding result, the image data and the like. Obviously, these arithmetic operations may be executed in a unit other than the arithmetic operation unit 63, such as the decoding unit 53. A setting unit 64 is a unit that sets an IP address of the communication unit 54, and the like.

A tuning unit 65 is a reading condition control section, that is, a unit that controls an imaging condition such as the exposure time, the amount of illumination light, and a gain, and an image processing condition (a coefficient of a filter and the like) in the decoding unit 53. The proper imaging condition and image processing condition are changed by influence of natural light to the workpiece 2 conveyed on the line 1, or the like. The tuning unit 65 thus searches for a more proper reading condition to set the AF control unit 61, the imaging control unit 62, and the decoding unit 53.

A UI management unit 66 is a unit that displays the image data on the image display device 14, accepts a user instruction from the input unit 56, and controls the lighting of the indicator. An image adjustment unit 67 is a unit that adjusts the image data acquired by the imaging element 31. For example, the image adjustment unit 67 functions as an image size reducing section that reduces a longitudinal/lateral size of the image data. Moreover, the image adjustment unit 67 may execute the size reduction by thinning out the image date at predetermined intervals, or by leaving pixel data of a central area of an original image and discarding pixel data of a peripheral area of the original image.

The storage unit 70 is a storage device such as a memory, and stores the decoding result 71 acquired by the decoding unit 53, the image data 72 acquired by the imaging element 31, and setting data 73 which is data set for reader 3 by a setting device such as the computer 4, and data set by the setting unit 64 and so on.

Figure 6:
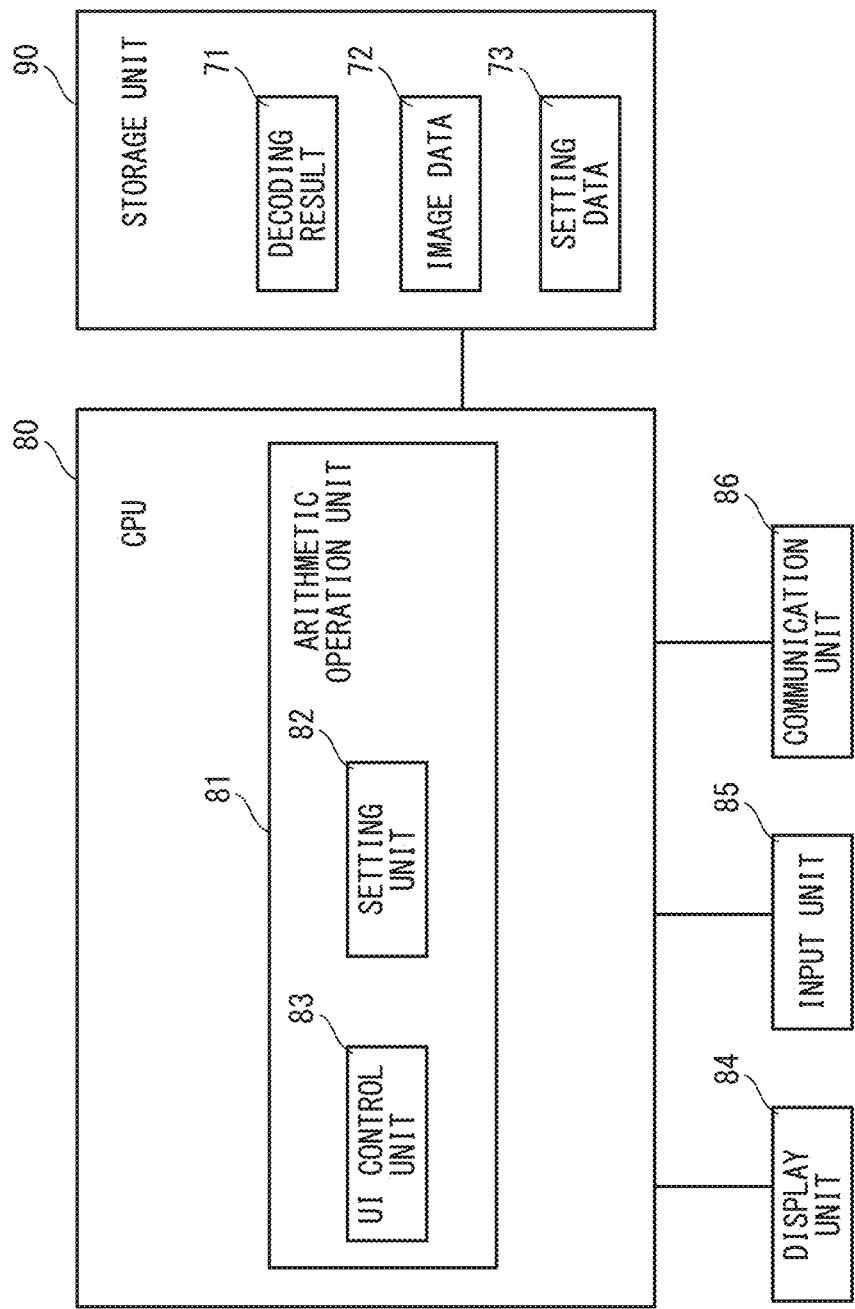
FIG. 6 is a diagram showing a computer connected to the optical information reading device.

FIG. 6 is a block diagram showing functions of the computer 4. Downsizing of the reader 3 makes it difficult to set all the functions of the reader 3 only by the display unit 55 and the input unit 56 of the reader 3. Consequently, a part of the setting data 73 may be created in the computer 4 to be transferred to the reader 3. A CPU 80 is a unit that controls respective units included by the computer 4, based on a program stored in a storage unit 90. A UI control unit 83, which is one function of an arithmetic operation unit 81, generates a user interface to set the imaging condition and the like of the reader 3, and a user interface to display the decoding result 71, the image data 72 and the like outputted by the reader 3 to cause a display unit 84 to display the user interfaces. The arithmetic operation unit 81 is a unit that executes various arithmetic operations. A communication unit 86 connects to the communication unit 54 of the reader 3 by wired or wireless connection to receive the decoding result 71 and the image data 72, and transmits the setting data 73 generated in a setting unit 82. The storage unit 90 is a memory, a hard disk drive (HDD), a solid state drive (SSD) or the like.

<Operating Modes>

In the reader 3, for example, three operating modes may be provided. A test mode (a tuning mode) is a mode to be executed when the reader 3 is installed on the line 1, in which tuning of the reading condition of the reader 3, and the like is executed. An operation mode is a mode in which the two-dimensional code of the workpiece 2 conveyed on the line 1 is read and decoded, and the decoding result is outputted to the PLC 5 and the computer 4. A maintenance mode is a mode to check a state of the reader 3 periodically or non-periodically after the reader 3 is installed on the line 1 and the operation is started.

Figure 7:
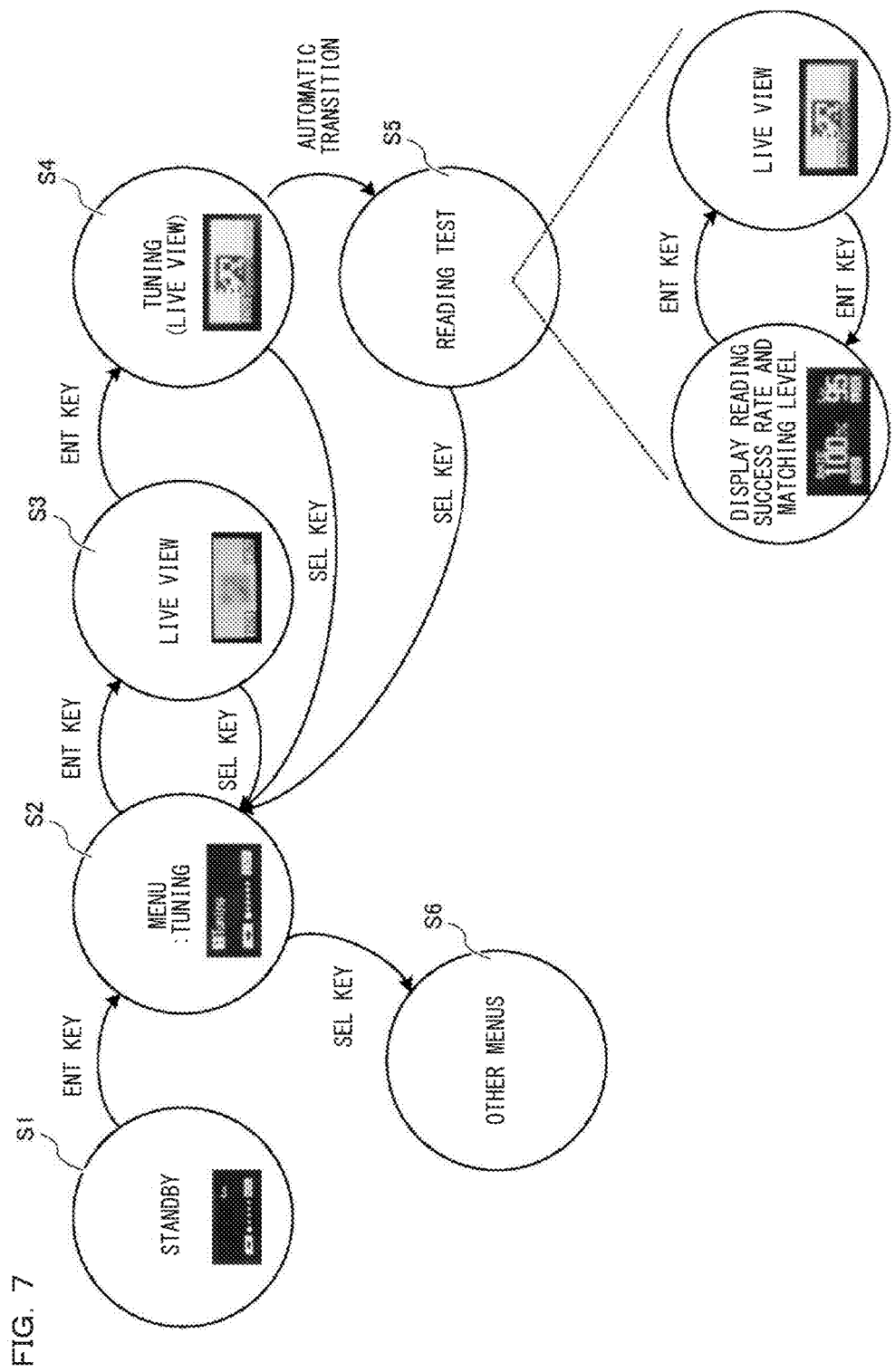
FIG. 7 is a state transition diagram of the optical information reading device.

FIG. 7 is a diagram showing a part of state transition of the reader 3. When pressing-down of the enter key 43 in a standby state S1 is sensed, the state transitions to a state S2, and the UI management unit 66 displays a menu on the image display device 14. In the state S2, transition to the tuning mode or transition to the other modes can be selected. When pressing-down of the enter key 43 in the state S2 is sensed, the state transitions to a state S3, and the UI management unit 66 instructs the imaging control unit 62 to execute photographing and start the illumination. The UI management function causes the image display device 14 to display the image data 72 acquired by the imaging element 31. The image data 72 may be a still picture or a moving picture. When the image data 72 is the moving picture, a so-called live view can be obtained. The moving picture may be obtained by updating the still picture periodically or when a motion of the workpiece 2 is sensed. The user can check whether or not the workpiece 2 is arranged at a proper position by the live view. For example, if the two-dimensional code is not wholly displayed, the workpiece 2 may be moved on the line 1 or a distance between the workpiece 2 and the reader 3 may be adjusted, so that the whole code is displayed. This allows the workpiece 2 and the reader 3 to be easily arranged at proper positions. When pressing-down of the enter key 43 is sensed in the state 3, the state transitions to a state S4, and the UI management unit 66 instructs the tuning unit 65 to start the tuning. The tuning unit 65 instructs the AF control unit 61 to perform focusing, and causes the imaging control unit 62 to adjust the exposure time, the amount of the illumination light, the gain and the like, and causes the decoding unit 53 to adjust the filter coefficient and the like. The tuning unit 65 may prepare a plurality of combinations of reading conditions in advance, and sequentially test each set to decide the set that will bring about the best decoding result as a set to be used in the operation mode. At this time, the arithmetic operation unit 63 may calculate the reading success rate and the matching level to provide them to the tuning unit 65. The tuning unit 65 controls the imaging control unit 62 and the decoding unit 53 so that the reading success rate and the matching level become maximum, and properly adjusts the reading condition. The UI management unit 66 may provide the above-described live view during the tuning. The user easily grasps whether or not the tuning is being performed properly, and a progress status of the tuning by viewing the live view. Upon being notified of completion of the tuning in the tuning unit 65, the UI management unit 66 causes the transition to a state S5. In the state S5, the UI management unit 66 causes the arithmetic operation unit 63 to conduct a reading test, and calculate the decoding result such as the reading success rate and the matching level, and causes the image display device 14 to display the decoding result. The user is enabled to easily check whether or not the tuning has been properly executed by checking the decoding result of the reading test. Upon sensing the pressing-down of the enter key 43, the UI management unit 66 may switch the display of the decoding result into the live view. Each time the pressing-down of the enter key 43 is sensed, the UI management unit 66 may alternately switch these types of display. Upon sensing the pressing-down of the select key 42 in the state S3 or S5, the UI management unit 66 causes the transition to the state S2. This ends the tuning. Upon sensing the pressing-down of the select key 42 in the state S2, the UI management unit 66 may display the other menu. The other menus may be the menu of the maintenance mode, the menu of the operation mode or the like.

<Display Examples>

Figure 8:
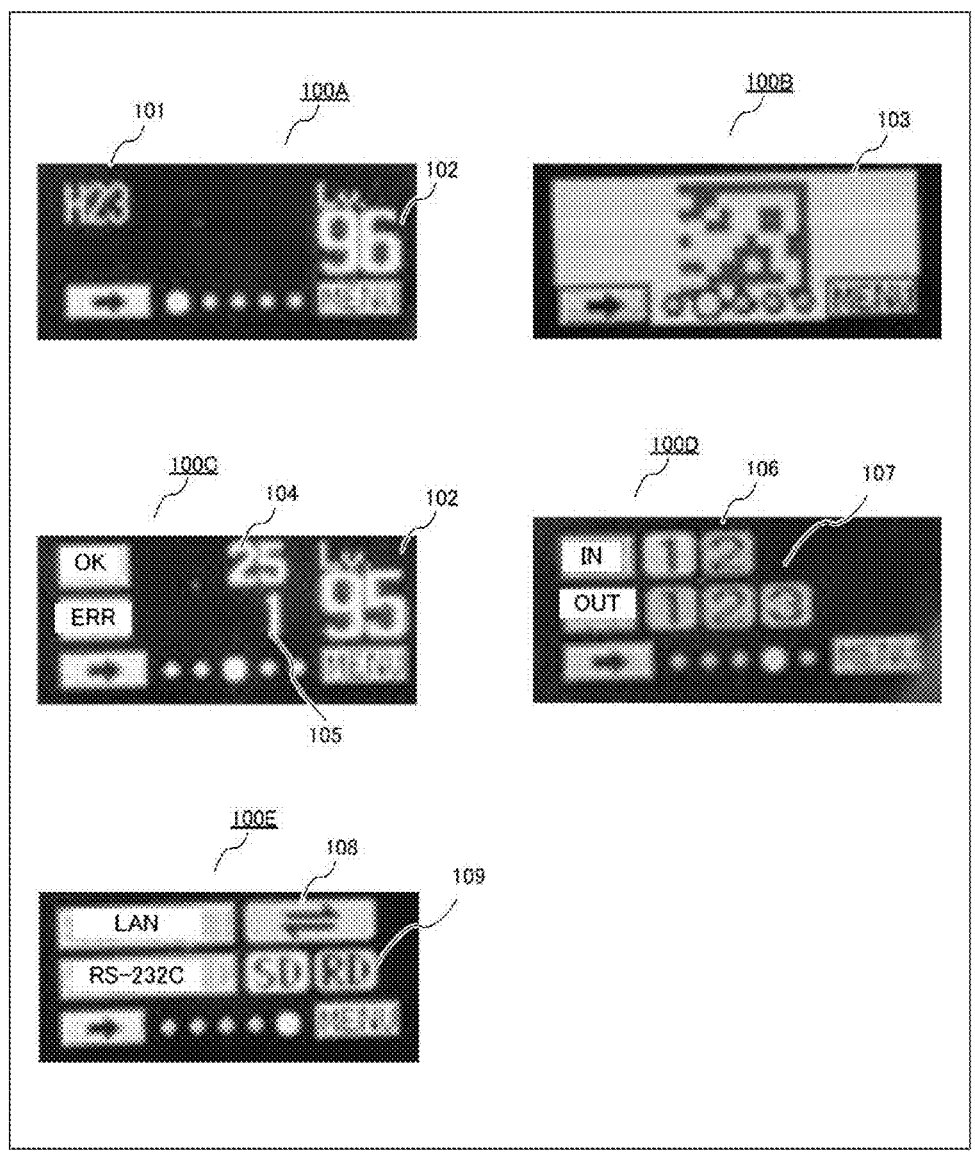
FIG. 8 is a diagram showing UI images.

FIG. 8 shows examples of UI images displayed on the image display device 14. FIG. 9 shows in which operating mode each of the UI images shown in FIG. 8 is displayed. An UI image 100A can be displayed in the test mode, in the operation mode and in the maintenance mode, and includes a character string 101 obtained by decoding the two-dimensional code, and a matching level 102. A guidance icon indicating to what operation each of the keys is assigned may also be displayed on a lower side of the screen. In place of the matching level, another reading stability index (the reading success rate or the PPC) may be displayed. Displaying the reading stability index and the character string restored from the two-dimensional code in this manner enables the user to easily grasp not only the character string but with what level of margin the two-dimensional code has been read.

A UI image 100B can be displayed in the test mode, in the operation mode, and in the maintenance mode and includes image data 103 obtained by capturing the image of the two-dimensional code. In the maintenance mode and in the test mode, the user can easily check whether or not the two-dimensional code is contained in a visual field of the optical system. Moreover, the user can change the position of the workpiece 2 or the reader 3 to contain the two-dimensional code in the visual field of the optical system. Moreover, the user can easily grasp a reason why a reading error occurs, such as whether or not the two-dimensional code is dirty, whether or not the two-dimensional code is out of focus, and the like.

A UI image 100C can be displayed in the operation mode, and includes statistical information in addition to the matching level 102 obtained by decoding the two-dimensional code. The statistical information is, for example, the number of workpieces or two-dimensional codes that have succeeded in the reading (the number of OKs 104), the number of workpieces or two-dimensional codes that have failed in the reading (the number of ERRs 105). The arithmetic operation unit 63 counts the number of OKs and the number of ERRs, based on the decoding result acquired from the decoding unit 53 to pass the same to the UI management unit 66. The UI management unit 66 creates the UI image 100C including the number of OKs 104 and the number of ERRs 105, and the matching level 102 to cause the image display device 14 to display the same. This makes it easy for the user to grasp a production state of the workpieces per day, and grasp the success/failure in the reading in real time.

An UI image 100D can be displayed in the test mode and in the maintenance mode, and includes input state information 106 indicating states of input terminals of the communication unit 54 and output state information 107 indicating states of output terminals. The UI management unit 66 acquires the information indicating the states of the input terminals and the states of the output terminals from the communication unit 54 to create the UI image 100D. In this example, the states of the two input terminals and the states of the three output terminals are included. Numbers are identification numbers given to the respective terminals. This makes it easy for the user to grasp whether or not the reader 3 and the PLC 5 are properly connected.

A UI image 100E can be displayed in the test mode and in the maintenance mode, and includes state information 108 indicating a state of a network interface of the communication unit 54, and state information 109 indicating a state of a serial communication interface. This makes it easy for the user to grasp whether or not the reader 3 is properly connected to the PLC 5 and the computer 4.

<Other Menus>

Figure 10:
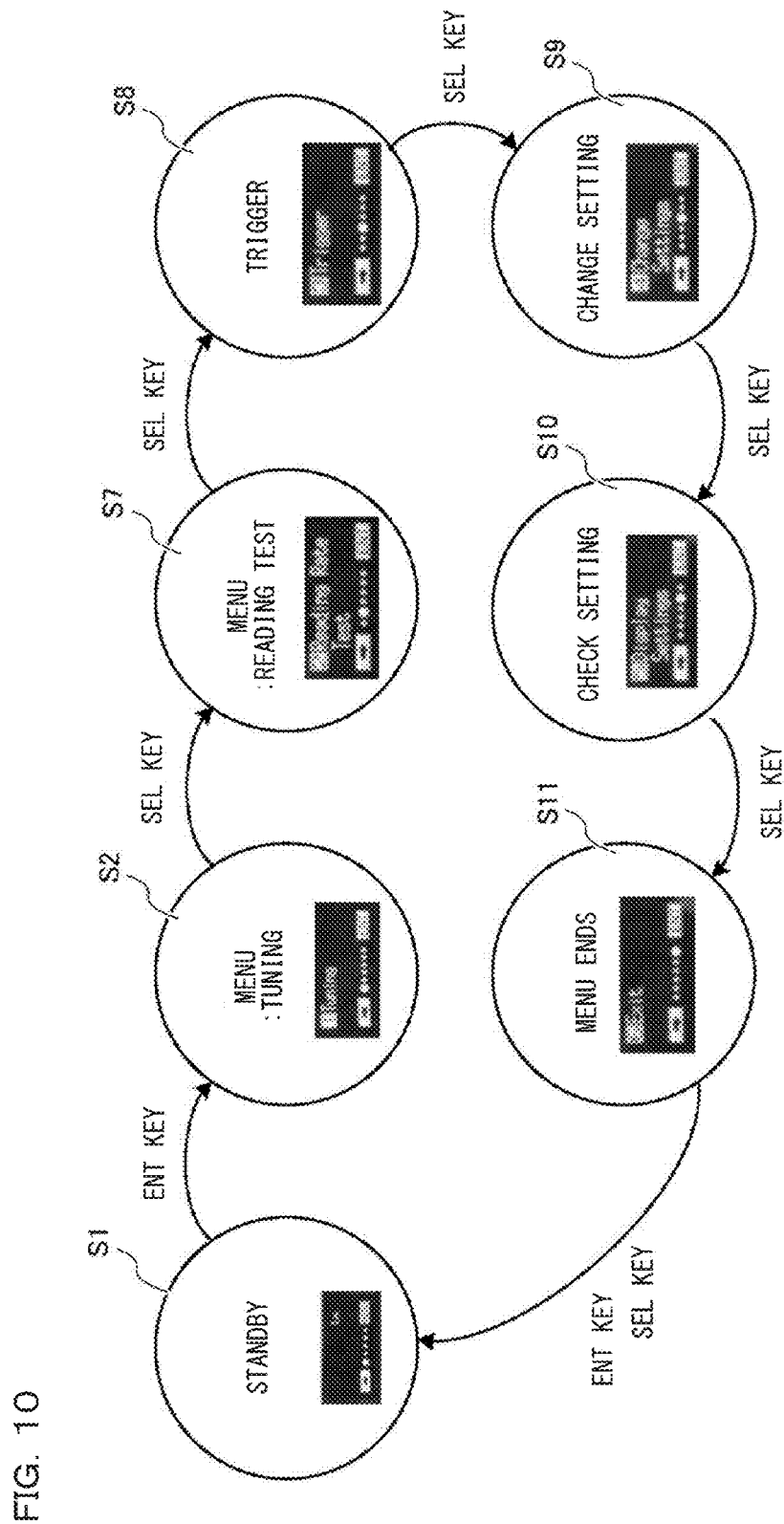
FIG. 10 is a diagram showing transition of a menu.

As described with reference to FIG. 7, upon sensing the pressing-down of the select key 42 in the state S2, the UI management unit 66 advances the state to a state S6. FIG. 10 is a diagram showing the state S6 in more detail. Here, the state S6 will be described as states S7 to S11. The state S7 is a state in which the reading test can be executed. Upon sensing the pressing-down of the enter key 43 in the state S7, the UI management unit 66 instructs the arithmetic operation unit 63 to execute the reading test, and acquires the result from decoding to display the UI image 100A or the like. Upon sensing the pressing-down of the select key 42 in the state S7, the UI management unit 66 causes the transition to the state S8. Upon sensing the pressing-down of the enter key 43 in state S8, the UI management unit 66 causes the arithmetic operation unit 63 to execute the reading of the two-dimensional code once and causes the indicator to display OK or NG. Upon sensing the pressing-down of the select key 42 in the state S8, the UI management unit 66 causes the transition to a state S9. Upon sensing the pressing-down of the enter key 43 in the state S9, the UI management unit 66 causes the setting unit 64 to execute change of the setting. Based on an instruction from the input unit 56, the setting unit 64 initializes setting of serial communication, switches lighting/non-lighting of the light emitter for the pointer, and inverts the display image of the image display device 14 upside down. Which is easier for the user to view between an upper arrangement and a lower arrangement of the indicator in the display image differs, depending on an attachment position of the reader 3. Thus, the vertical inversion function of the display image is effective. Upon sensing the pressing-down of the select key 42 in the state S9, the UI management unit 66 causes the transition to a state S10. Upon sensing the pressing-down of the enter key 43 in the state S10, the UI management unit 66 reads the setting data 73 created by the setting unit 64 to cause the image display device 14 to display the data. For example, information such as an IP address, a subnet mask, an MAC address, a serial communication protocol, a model of the reader 3 and the like is displayed. Upon sensing the pressing-down of the select key 42 in the state S10, the UI management unit 66 causes the transition to the state S11. Upon sensing the pressing-down of the enter key 43 in the state S11, the UI management unit 66 ends the display of the menu, and causes the transition to the state S1, which is the standby state.

<Size Reduction/Thinning-Out of Image Data>

As described above, the image adjustment unit 67 reduces a longitudinal/lateral size of the image data acquired by the imaging element 31, by which a load of the display processing is reduced. For example, when the size of the image data (referred to as a captured image) acquired by the imaging element 31 is 1280×1024 pixels, a size that can be displayed on the image display device 14 may be 96×32 pixels. Thus, significant size reduction is required. The size reduction of the image is applied to not only the still picture but the moving picture of the live view.

(1) Simple Size Reduction

Simple size reduction is a method of simply compressing the size of the captured image to the size of the display image. Since thinning-out described later is not performed, an arithmetic operation load is high.

(2) Thinning-Out Size Reduction

Figure 11:
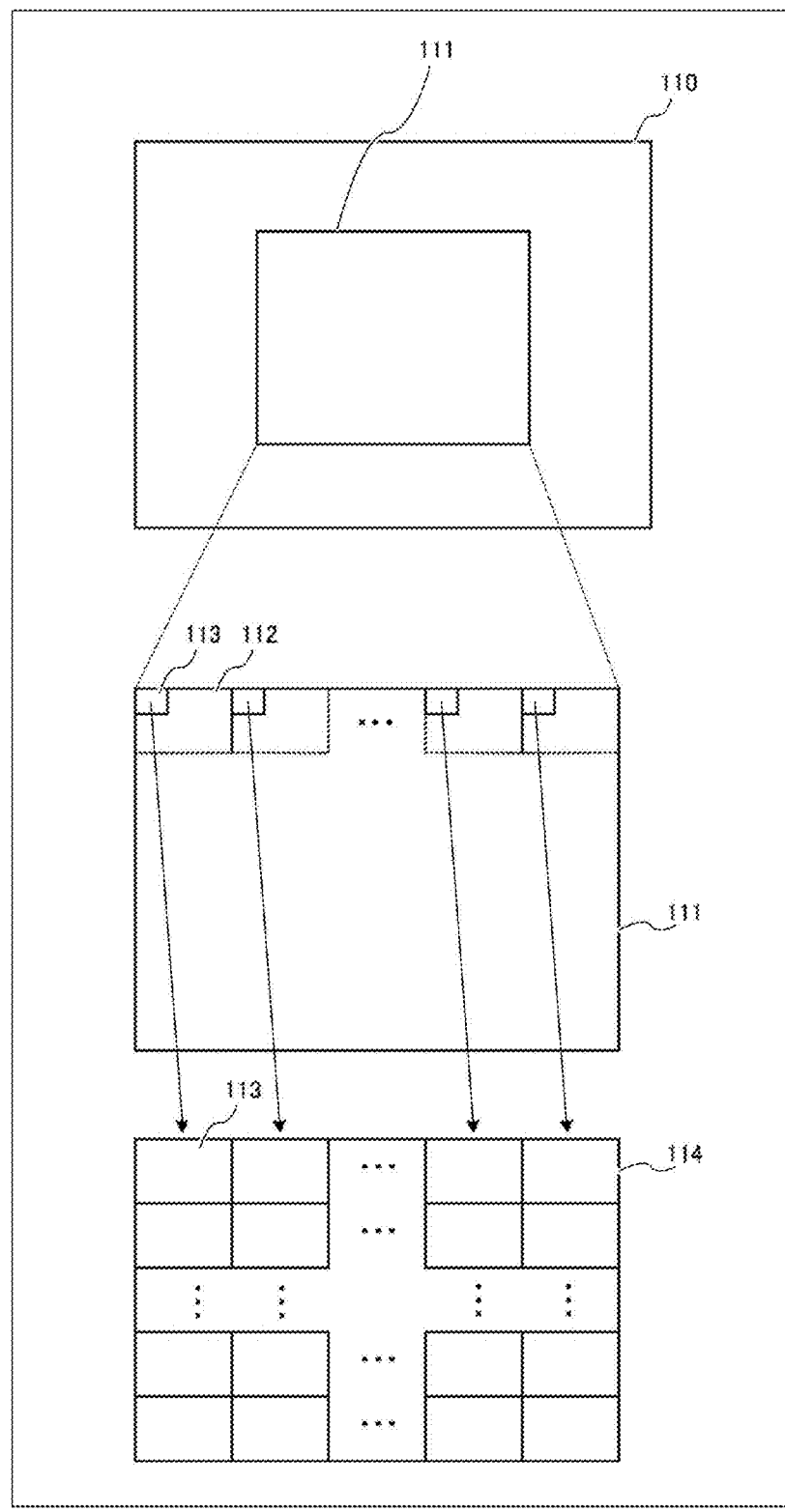
FIG. 11 is a diagram showing a size reduction method of an image.

As shown in FIG. 11, a method of dividing a captured image 110 into a display area 111 in a center, and a non-display area (a peripheral area) around the display area 111 to simply compress an image of the display area 111 to the display size can be considered. In this case, pixels of the peripheral non-display area are all discarded. However, the two-dimensional code may not be wholly contained in the display area 111. Thus, further size reduction processing may be required.

For example, the image of the display area 111 may be cut out so that the whole of the two-dimensional code is contained, and the pixels may be thinned out at a certain thinning-out rate, by which the size of the image of the display area 111 may be compressed to the size of the display image. That is, the pixels are thinned out at predetermined intervals.

Thinning-Out Method No. 1

For example, of (8×8) pixel groups 112, (3×3) pixel groups 113 in an upper left portion are left, and the remaining pixels are thinned out. This is applied to the whole of the image of the display area 111, so that the (3×3) pixel groups 113 are joined to create a display image 114 made up of 96×32 pixels.

Thinning-Out Method No. 2

Figure 12:
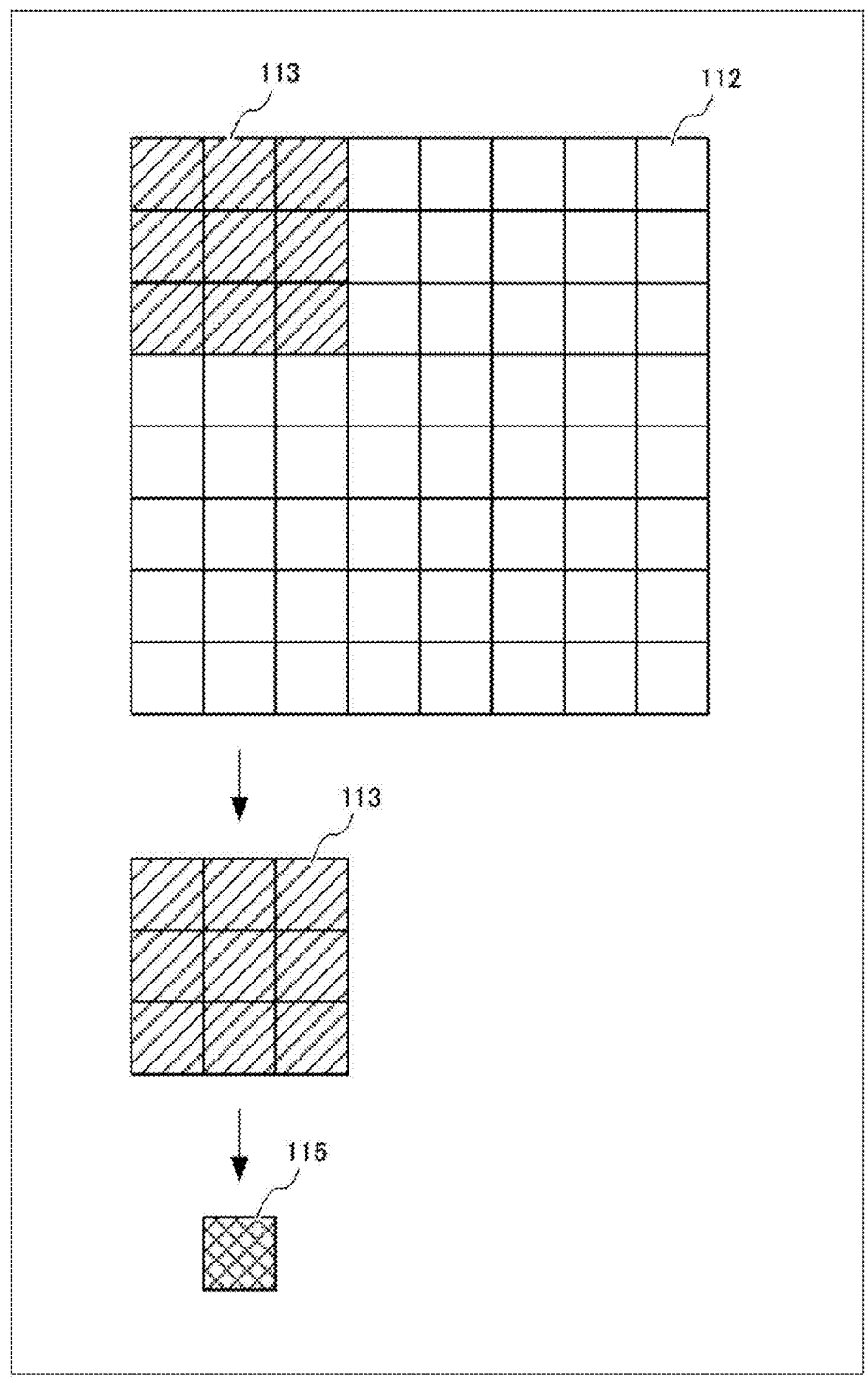
FIG. 12 is a diagram showing a size reduction method of an image.

As shown in FIG. 12, for example, of the (8×8) pixel groups 112, the (3×3) pixel groups 113 in the upper left portion are left, and an average value of the left (3×3) pixel groups 113 is found, and the remaining pixels are thinned out. This is applied to the whole of the image of the display area 111, pixels 115 of the average value are joined to create the display image made of 96×32 pixels. One pixel may be generated by weighted average processing. While the upper left portion is left, any portion of the (8×8) pixel groups 112 may be cut out as the (3×3) pixel groups 113, and an upper right portion or a center may be cut out.

In addition to the above-described thinning-out processing, the image adjustment unit 67 may apply gradation reduction. For example, if gradation of the captured image is 8-bit gradation, gradation of the display image is reduced to 4-bit gradation. For example, high-order 4 bits of 8 bits are left, and low-order 4 bits are cut.

<Conclusion>

According to the present embodiment, the decoding unit 53 decodes the image data acquired by the imaging element 31, and the arithmetic operation unit 63 arithmetically operates the matching level indicating the easiness of the decoding of the code, the stability of the decoding, the margin of decoding, or pixel-per-cell in the decoding unit 53. Furthermore, the UI management unit 66 and the image display device 14 display, as the image, at least one of the matching level, the image data acquired by the imaging element 31, and the average success rate (reading success rate) of the decoding obtained by decoding a plurality of pieces of image data obtained by capturing the image of the code a plurality of times. The matching level and the reading success rate are information that can be conveniently checked in the setting work and the maintenance work of the reader 3, and the reader 3 displays these types of information. This enables the user to perform the setting work and the maintenance work only with the reader 3. In particular, the matching level is useful for grasping whether the two-dimensional code has been read with a margin or with almost no margin. This is because, for example, when fewer error corrections of the two-dimensional code are required, the matching level is higher, and if a number of error corrections are required, the matching level is lower. Moreover, displaying the image data of the two-dimensional code allows the user to easily determine which two-dimensional code of a plurality of two-dimensional codes provided in the workpiece has been read.

The tuning unit 65 controls the reading condition including the imaging condition of the imaging element 31 and the image processing condition in the decoding unit 53. As described with reference to FIGS. 7 and 8, when the tuning starts, which is processing in which the tuning unit 65 searches for the reading condition suitable for the reading of the code, the image display device 14 may display, as the progress status of the tuning, at least one of the moving picture of the live view based on the image data acquired by the imaging element 31, and the character string obtained by decoding the image data by the decoding unit 53, the matching level, and the reading success rate, which are the result of the tuning. The user can determine whether or not the position of the workpiece 2 is proper by checking the moving picture of the live view. Moreover, even when the character string is decoded properly, the setting of the positions of the workpiece 2 and the reader 3 can be easily changed more properly by checking the matching level and the reading success rate. In the related art, only whether or not the reading has succeeded is shown by an indicator, which does not allow the user to grasp a level of the stability of the reading. For example, there is a possibility that the reading has failed due to slight variation in height of the workpiece 2 or the like. Thus, presenting the matching level and the reading success rate enables the user to set the reader 3 accurately.

The reader 3 may further have the setting mode (the test mode/the tuning mode) for executing the tuning, the operation mode in which the decoding is executed for each of the plurality of workpieces 2 conveyed on the line, and the maintenance mode in which the reading condition is corrected. As described with reference to FIGS. 8 and 9, in the setting mode, the UI management unit 66 and the image display device 14 may display at least one of the character string obtained by decoding the image data, the matching level, the moving picture of the live view, and the communication states of the input/output terminals for the communication between the optical information reading device and external equipment, or the connection states of the external equipment (e.g., the computer 4 and the PLC 5) to the input/output terminals, while switching the display. That is, all of these types of information may be displayed simultaneously, or only a part thereof may be displayed. In the case where only a part is displayed, these types of information are sequentially switched and displayed, which enables all the information to be checked even on the small image display device. In the operation mode, the UI management unit 66 and the image display device 14 may display at least one of the character string obtained by decoding the image data, the matching level, the moving picture of the live view, and the reading success rate, while switching the display. Moreover, in the maintenance mode, the UI management unit 66 and the image display device 14 may display at least one of the character string obtained by decoding the image data, the matching level, the moving picture of the live view, and the communication states of the input/output terminals for the communication between the optical information reading device and the external equipment, or the connection states of the external equipment to the input/output terminals, while switching the display. Also, all of these types of information may be displayed simultaneously, or only a part thereof may be displayed.

As described with reference to FIG. 7, the enter key 43 of the input unit 56 functions as an instruction unit into which an instruction from the user is inputted. The UI management unit 66 and the image display device 14 may switch a display content in accordance with the instruction inputted into the instruction unit. As shown in FIG. 7, the screen in which the matching level and the reading success rate are displayed, and the screen in which the live view moving picture is displayed can be switched by a simple operation.

The image adjustment unit 67 may reduce the longitudinal/lateral size of the image data acquired by the imaging element 31. The UI management unit 66 and the image display device 14 may display the image data reduced in size by the image adjustment unit 67 as a still picture or a moving picture. This largely reduces a load of the image processing. That is, the control unit can be made of a low-cost part. Moreover, the display of the image will be speeded up.

As described with reference to FIGS. 11 and 12, the image adjustment unit 67 may reduce the size of the image data by thinning out the image data at predetermined intervals, or by leaving the pixel data of the central area of the image data and discarding the pixel data of the peripheral area of the image data. This allows the size reduction of the image data to be achieved without deteriorating the quality of the image.

The UI management unit 66 and the image display device 14 may replace, with a substitute symbol (e.g., ■ or the like), a character string (e.g., a two-byte system character string of kanji, hiragana, katakana, or the like) other than an ASCII code of the character strings obtained by decoding the image data by the decoding unit 53 to display the resultant character string. This is because the character string displayed on the image display device 14 is sufficient if it can be determined whether or not the setting of the reader 3 is proper. The use of the substitute symbol makes the display content simple, which prevents the user from feeling troublesome.

As shown in FIG. 7, the UI management unit 66 and the image display device 14 may display the matching level and the reading success rate side by side. This enables the two types of information to be grasped simultaneously.

The image display device 14 may display the matching level and reading success rate when the tuning is completed in the test mode. This allows the user to easily determine whether or not the tuning has normally completed.

There may further be provided the indicator that indicates whether the decoding unit 53 has succeeded or failed in the decoding, based on each piece of the image data. In particular, in the operation mode in which the decoding is performed for each of the plurality of workpieces 2 conveyed on the line 1, the UI management unit 66 and the image display device 14 may display the moving picture of the live view, and the indicator may indicate whether the decoding unit 53 has succeeded or failed in the decoding each time the imaging element 31 captures the image of the code of the workpiece 2. When the moving picture of the live view is displayed, the image of the two-dimensional code can be displayed large. This is because if the success/failure (OK/ERR) in the reading is displayed as an image, the longitudinal/lateral size of the moving picture of the live view needs to be made smaller. Moreover, even if the success/failure in the reading is not displayed in the image display device 14, the user can check the success/failure by the indicator.

Moreover, in the operation mode in which each of the plurality of workpieces 2 conveyed on the line 1 is decoded, the UI management unit 66 and the image display device 14 may display the matching level, and the indicator may indicate whether the decoding unit 53 has succeeded or failed in the decoding, each time the imaging element 31 captures the image of the code of the workpiece 2. This allows the user to easily grasp what level of margin the reading has in each of the plurality of workpieces 2 with production variations, which workpieces conveyed in the operation mode. Further, when the instruction to switch the display is inputted, the UI management unit 66 and the image display device 14 may switch the display to the character string obtained by decoding the image data or the moving picture of the live view. This makes it easier for the user to check not only the matching level but the character string and the moving picture of the two-dimensional code in the operation mode as well.

As described with reference to FIGS. 2B and 3A to 3C, the image display device 14 is supported by the holder 13. Furthermore, the illumination substrate 18 is employed that extends in the direction perpendicular to the holder 13 and is engaged with the holder 13 to support the holder 13. This allows a substrate for mounting the image display device 14 to be omitted. Moreover, on the illumination substrate 18 are mounted the push-button type switches 24, 25 in each of which the pressing surface exists on the same side as the display surface side of the image display device 14. Thus, a stress that can be applied to the switches 24, 25 acts in a longitudinal direction of the illumination substrate 18. Since the illumination substrate 18 is high in strength in the longitudinal direction, this constitution is also advantageous with respect to this stress.

As described with reference to FIG. 4, the select key 42 is employed as the selection key to select the display item or the setting item, and the enter key 43 is arranged on the display panel surface as a confirmation key to confirm the item selected with the select key 42. In particular, the select key 42 and the enter key 43 are provided on the side close to the illumination substrate 18 of two longitudinal sides of the image display device 14. Thus, even when the select key 42 and the enter key 43 are pressed, the display panel surface is hard to be warped.

The indicator 44 that indicates whether the decoding unit 53 has succeeded or failed in the decoding based on each piece of the image data may be provided between the select key 42 and the enter key 43. The light emitters 32 of the indicator 44 are mounted on the illumination substrate 18. This allows a mounting space to be efficiently used. As described with reference to FIG. 3C, since the holder 13 is provided with the light-shielding walls 36a to 36d, the light of the light emitters 32 of the indicator 44 is hard to leak out to the side of the image display device 14.

The reader 3 is provided with the select key 42 and the enter key 43 as the instruction section that instructs the tuning unit 65 to start the tuning. Thus, the tuning can be carried out by the reader 3 alone. Thereby, labor for connecting the computer 4 and the like to the reader 3 and instructing the reader 3 to carry out the tuning from the computer 4 can be omitted.

In FIGS. 2A and 2B, the image display device 14 is provided in a first surface of a plurality of outer surfaces of the housing making up the reader 3, and the light sources that illuminate the code provided in the workpiece 2 are provided in a surface adjacent to the first surface. However, the light sources for illuminating the code provided in the workpiece 2 may be provided in a second surface which is an opposite surface of the first surface. This makes it easier for the user to view the display content of the image display device 14 when the reader 3 is installed above the workpiece 2. Moreover, there is an advantage that when the user views the display content of the image display device 14, the light from the light sources for illumination is prevented from entering eyes.

The image display device 14 may display black characters in a white background, or may display white characters in a black background. In particular, in the latter case, the user easily finds lighting of the indicator.

As described above, at least a part of the setting data 73 is displayed in the image display device 14. However, the computer 4 may read the setting data 73 from the reader 3 to write in the storage unit 90, and further display on the display unit 84. Since as compared with the image display device 14 of the reader 3, the display unit 84 of the computer 4 has a large screen size, the user can check more setting data. Moreover, the display of the reader 3 is made auxiliary, which easily downsizes the reader 3.

As shown in FIGS. 2A to 4, the display unit 55 and the input unit 56 may be provided in the same surface, and the optical system and the illumination system may be provided in different surfaces. This constitution brings about an advantage that when the two-dimensional code exists on a side surface of the workpiece 2, and the reader 3 is installed so that an optical axis hits on the side surface of the workpiece 2, the user can easily check the display of the display unit 55, and can easily perform an operation to the input unit 56. As shown in FIG. 2A, a connector for communication is arranged in a surface (a bottom surface) on the opposite side of the surface (the upper surface) where the display unit 55 and the input unit 56 are provided. This constitution advantageously prevents the communication cables from disturbing visual check on the display unit 55 and the input operation to the input unit 56.

What is claimed is:

1. A fixed optical information reading device comprising:
    an instruction unit provided in the fixed optical information reading device;
    an imaging section that captures an image of a code provided in a workpiece;
    a decoding section that decodes image data acquired by the imaging section;
    an arithmetic operation section that arithmetically operates a matching level indicating easiness of the decoding of the code, stability of the decoding, a margin of the decoding, or pixel-per-cell in the decoding section;
    an image display section that displays, as an image, at least one of the matching level, the image data acquired by the imaging section, and an average success rate of the decoding obtained by decoding a plurality of image data obtained by capturing the image of the code a plurality of times; and
    a reading condition control section that controls a reading condition including an imaging condition of the imaging section, and an image processing condition in the decoding section, wherein
    the reading condition control section can perform tuning which is processing of searching for the reading condition suitable for the reading of the code, by an instruction from the instruction unit, and
    after the tuning ends, the image display section displays at least one of the matching level, the image data acquired by the imaging section, and the average success rate of the decoding obtained by decoding the plurality of pieces of image data obtained by capturing the image of the code the plurality of times.

2. The fixed optical information reading device according to claim 1, wherein when the tuning starts, the image display section displays, as a progress status of the tuning, at least one of a moving picture of a live view based on the image data obtained by the imaging section, and a character string obtained by decoding the image data by the decoding section, the matching level, and the average success rate, which are results of the tuning.

3. The fixed optical information reading device according to claim 2, further comprising:
    an indicator that indicates whether the decoding section succeeds or fails in the decoding, based on each piece of the image data.

4. The fixed optical information reading device according to claim 3, wherein
    in the operation mode in which the decoding is executed for each of the plurality of workpieces conveyed on the line,
    the image display section displays the moving picture of the live view, and the indicator indicates whether the decoding section succeeds or fails in the decoding each time the imaging section captures the image of the code of the workpiece.

5. The fixed optical information reading device according to claim 3, wherein
in the operation mode in which the decoding is executed for each of the plurality of workpieces conveyed on the line,
the image display section displays the matching level, and the indicator indicates whether the decoding section succeeds or fails in the decoding each time the imaging section captures the image of the code of the workpiece, and
when an instruction to switch the display is inputted, the image display section displays the moving picture of the live view or the character string obtained by decoding the image data.

6. The fixed optical information reading device according to claim 2, further comprising:
an instruction section that instructs the reading condition control section to start the tuning.

7. The fixed optical information reading device according to claim 1, further comprising:
a setting mode in which the tuning is executed, an operation mode in which the decoding is executed for each of a plurality of workpieces conveyed on a line, and a maintenance mode in which the reading condition is corrected, wherein
the image display section,
in the setting mode, displays the character string obtained by decoding the image data, the matching level, the moving picture of the live view, and a communication state of an input/output terminal for communication between the optical information reading device and external equipment or a connection state of the external equipment to the input/output terminal,
in the operation mode, displays the character string obtained by decoding the image data, the matching level, the moving picture of the live view, and the average success rate, and
in the maintenance mode, displays the character string obtained by decoding the image data, the matching level, the moving picture of the live view, and the communication state of the input/output terminal for communication between the optical information reading device and the external equipment or the connection state of the external equipment to the input/output terminal.

8. The fixed optical information reading device according to claim 7, wherein when the tuning is completed in the setting mode, the image display section displays the matching level and the average success rate.

9. The fixed optical information reading device according to claim 1, wherein the image display section switches a display content in accordance with the instruction inputted to the instruction unit.

10. The fixed optical information reading device according to claim 1, further comprising:
an image size reducing section that reduces a longitudinal/lateral size of the image data acquired by the imaging section, wherein
the image display section displays the image data whose size is reduced by the image size reducing section as a still picture or the moving picture.

11. The fixed optical information reading device according to claim 10, wherein the image size reducing section reduces the size of the image data by thinning out the image data at predetermined intervals, or leaving pixel data of a central area of the image data and discarding pixel data of a peripheral area of the image data.

12. The fixed optical information reading device according to claim 1, wherein the image display section replaces, with a substitute symbol, a character string other than an ASCII code of character strings obtained by decoding the image data by the decoding section to display the resultant string character.

13. The fixed optical information reading device according to claim 1, wherein the image display section displays the matching level and the average success rate side by side.

14. The fixed optical information reading device according to claim 1, comprising:
a support member that supports the image display section;
a substrate that extends in a direction perpendicular to the support member and is engaged with the support member to support the support member, and
a push-button type switch arranged in the substrate, in which a pressing surface exists on a same side as a display surface side of the image display section.

15. The fixed optical information reading device according to claim 14, wherein
the push button type switch comprises a selection key and a confirmation key, the selection key for selecting a display item or a setting item, the confirmation key for confirming the item selected with the selection key, and
the selection key and the confirmation key are provided on a side close to the substrate of two longitudinal sides of the image display section.

16. The fixed optical information reading device according to claim 15, wherein the indicator is provided between the selection key and the confirmation key, and is mounted on the substrate, the indicator for indicating whether the decoding section succeeds or fails in the decoding, based on each piece of the image data.

17. The fixed optical information reading device according to claim 1, wherein the image display section is provided in a first surface of a plurality of outer surfaces of a housing making up the optical information reading device, and a light source that illuminates the code provided in the workpiece is provided in a second surface, which is a surface on an opposite side of the first surface.

18. The fixed optical information reading device according to claim 1, wherein the instruction unit comprises an input unit provided on an outer surface of a housing of a housing making up the optical information reading device.

19. The fixed optical information reading device according to claim 18, wherein the input unit comprises a select key and enter key.

* * * * *